US 11,763,995 B2

(12) United States Patent
Lee et al.

(10) Patent No.: US 11,763,995 B2
(45) Date of Patent: Sep. 19, 2023

(54) MULTILAYER CERAMIC CAPACITOR

(71) Applicant: SAMSUNG ELECTRO-MECHANICS CO., LTD., Suwon-si (KR)

(72) Inventors: Taek Jung Lee, Suwon-si (KR); Byeong Chan Kwon, Suwon-si (KR); Jin Kyung Joo, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/678,520

(22) Filed: Feb. 23, 2022

(65) Prior Publication Data
US 2022/0230811 A1 Jul. 21, 2022

Related U.S. Application Data

(63) Continuation of application No. 16/803,769, filed on Feb. 27, 2020, now Pat. No. 11,335,510.

(30) Foreign Application Priority Data

Aug. 2, 2019 (KR) ........................ 10-2019-0094177

(51) Int. Cl.
*H01G 4/30* (2006.01)
*H01G 2/02* (2006.01)
(Continued)

(52) U.S. Cl.
CPC ................ *H01G 4/30* (2013.01); *H01G 2/02* (2013.01); *H01G 4/012* (2013.01); *H01G 4/1218* (2013.01)

(58) Field of Classification Search
CPC ............ H01G 4/30; H01G 2/02; H01G 4/012; H01G 4/1218; H01G 4/232; H01G 4/248
(Continued)

(56) References Cited

U.S. PATENT DOCUMENTS 9,236,186 B2 1/2016 Ahn et al.
9,258,896 B2 2/2016 Park et al.
(Continued)

FOREIGN PATENT DOCUMENTS

CN 103730254 A 4/2014
CN 104517730 A 4/2015
(Continued)

OTHER PUBLICATIONS

Chinese Office Action dated Jun. 30, 2022, issued in corresponding Chinese Patent Application No. 202010393550.X (with English translation).
(Continued)

*Primary Examiner* — Arun Ramaswamy
(74) *Attorney, Agent, or Firm* — Morgan, Lewis & Bockius LLP

(57) ABSTRACT

A multilayer ceramic capacitor includes a body including a dielectric layer, and first and second internal electrodes with the dielectric layer interposed therebetween, and a first through-electrode passing through the body and connected to the first internal electrode; a second through-electrode passing through the body and connected to the second internal electrode; first and second external electrodes formed on the first and second surfaces and connected to the first through-electrode; and third and fourth external electrodes spaced apart from the first and second external electrodes and connected to the second through-electrode, wherein the first to fourth external electrodes are sintered electrodes including nickel, and each comprises a first
(Continued)

plating layer and a second plating layer sequentially stacked on the sintered electrodes.

19 Claims, 11 Drawing Sheets

(51) Int. Cl.
  *H01G 4/12* (2006.01)
  *H01G 4/012* (2006.01)
(58) Field of Classification Search
  USPC ............ 361/306.3, 321.2, 321.3, 301.4, 309, 361/321.1
  See application file for complete search history.

(56) References Cited

U.S. PATENT DOCUMENTS

| | | | |
|---|---|---|---|
| 9,472,343 B2* | 10/2016 | Ahn | ............... H01G 4/30 |
| 10,354,802 B1 | 7/2019 | Bae et al. | |
| 10,650,971 B2 | 5/2020 | Jung et al. | |
| 2009/0086406 A1* | 4/2009 | Lee | ............... H01G 4/228 |
| | | | 361/306.3 |
| 2010/0302704 A1 | 12/2010 | Ogawa et al. | |
| 2014/0104750 A1 | 4/2014 | Ahn et al. | |
| 2014/0182911 A1 | 7/2014 | Lee et al. | |
| 2015/0090485 A1 | 4/2015 | Lee et al. | |
| 2015/0124370 A1 | 5/2015 | Ahn et al. | |
| 2015/0124371 A1 | 5/2015 | Park et al. | |
| 2016/0093438 A1 | 3/2016 | Sasabayashi | |
| 2016/0284475 A1 | 9/2016 | Onoue et al. | |
| 2017/0345561 A1* | 11/2017 | Asai | ............... H01G 4/30 |
| 2018/0019064 A1 | 1/2018 | Han et al. | |
| 2018/0027656 A1 | 1/2018 | Jung et al. | |
| 2019/0066923 A1* | 2/2019 | Jung | ............... H01G 4/008 |
| 2019/0131070 A1 | 5/2019 | Onodera et al. | |
| 2019/0295771 A1* | 9/2019 | Horn | ............... H01G 4/012 |
| 2019/0326061 A1* | 10/2019 | Tomizawa | ............ H05K 1/181 |
| 2021/0005384 A1 | 1/2021 | Lee et al. | |

FOREIGN PATENT DOCUMENTS

| | | |
|---|---|---|
| CN | 104616887 A | 5/2015 |
| CN | 104637680 A | 5/2015 |
| CN | 107644735 A | 1/2018 |
| CN | 112185700 A | 1/2021 |
| JP | 2009-147178 A | 7/2009 |
| JP | 2010-123613 A | 6/2010 |
| JP | 2014-082434 A | 5/2014 |
| JP | 2016-181663 A | 10/2016 |
| JP | 2019-041093 A | 3/2019 |
| KR | 10-2019-0049497 A | 5/2019 |

OTHER PUBLICATIONS

Japanese Office Action dated Jul. 25, 2023, issued in corresponding Japanese Patent Applicaton No. 2020-040225.

* cited by examiner

MULTILAYER CERAMIC CAPACITOR

CROSS-REFERENCE TO RELATED APPLICATION

The present application is the continuation application of U.S. patent application Ser. No. 16/803,769 filed Feb. 27, 2020, which claims the benefit of priority to Korean Patent Application No. 10-2019-0094177 filed on Aug. 2, 2019 in the Korean Intellectual Property Office, the disclosure of which is incorporated herein by reference in its entirety.

TECHNICAL FIELD

The present disclosure relates to a multilayer ceramic capacitor.

BACKGROUND

Recently, the use of electronic devices using a multilayer ceramic capacitor (MLCC) has rapidly increased. In particular, as the fifth generation (5G) era has come about, smartphones require a greater number of capacitors with higher capacitance thereof. On the other hand, due to the technical miniaturization of set products, a mounting area of passive components such as an MLCC and an inductor has been decreased, and therefore, miniaturization and thinning of the passive components are further required. Accordingly, there is a proposed method in which a multilayer ceramic capacitor and an inductor are packaged with an IC and an AP, embedded in a substrate, or mounted on a lower end portion of an AP in a land side capacitor (LSC) type manner to increase the degree of mounting freedom.

In this case, not only a reduction in mounting area but also a reduction in equivalent series inductance (ESL), generated in a substrate, may be achieved. Accordingly, there is increasing demand for a multilayer ceramic capacitor product having a low thickness.

However, in a lower electrode, applied to a low profile capacitor having a significantly low thickness, such as an embedded capacitor and a surface-mount capacitor, adhesion strength between the lower electrode and a metal plating layer is poor.

SUMMARY

An aspect of the present disclosure is to provide a multilayer ceramic capacitor having improved adhesion strength when a substrate is mounted or embedded.

Another aspect of the present disclosure is to provide a multilayer ceramic capacitor having improved reliability while being able to be miniaturized and thinned.

According to an aspect of the present disclosure, a multilayer ceramic capacitor includes a body including a dielectric layer, and first and second internal electrodes with the dielectric layer interposed therebetween, and including fifth and sixth surfaces opposing each other in a first direction, third and fourth surfaces opposing each other in a second direction, and first and second surfaces opposing each other in a third direction; a first through-electrode passing through the body and connected to the first internal electrode; a second through-electrode passing through the body and connected to the second internal electrode; first and second external electrodes formed on the first and second surfaces and connected to the first through-electrode; and third and fourth external electrodes spaced apart from the first and second external electrodes and connected to the second through-electrode, wherein the first to fourth external electrodes are sintered electrodes including nickel, and each comprises a first plating layer and a second plating layer sequentially stacked on the sintered electrodes, wherein the first plating layer and the second plating layer extend to and are formed on the third and fourth surfaces of the body, respectively.

BRIEF DESCRIPTION OF DRAWINGS

The above and other aspects, features, and advantages of the present disclosure will be more clearly understood from the following detailed description, taken in conjunction with the accompanying drawings, in which:

FIG. 4A is a cross-sectional view in which a first internal electrode is visible, and FIG. 4B is a cross-sectional view in which a second internal electrode is visible.

FIG. 8A is a cross-sectional view in which a first internal electrode is visible, and FIG. 8B is a cross-sectional view in which a second internal electrode is visible.

FIG. 9A is a cross-sectional view in which a first internal electrode is visible, and FIG. 9B is a cross-sectional view in which a second internal electrode is visible.

FIG. 10A is a cross-sectional view in which a first internal electrode is visible, and FIG. 10B is a cross-sectional view in which a second internal electrode is visible.

DETAILED DESCRIPTION

Figure 1:
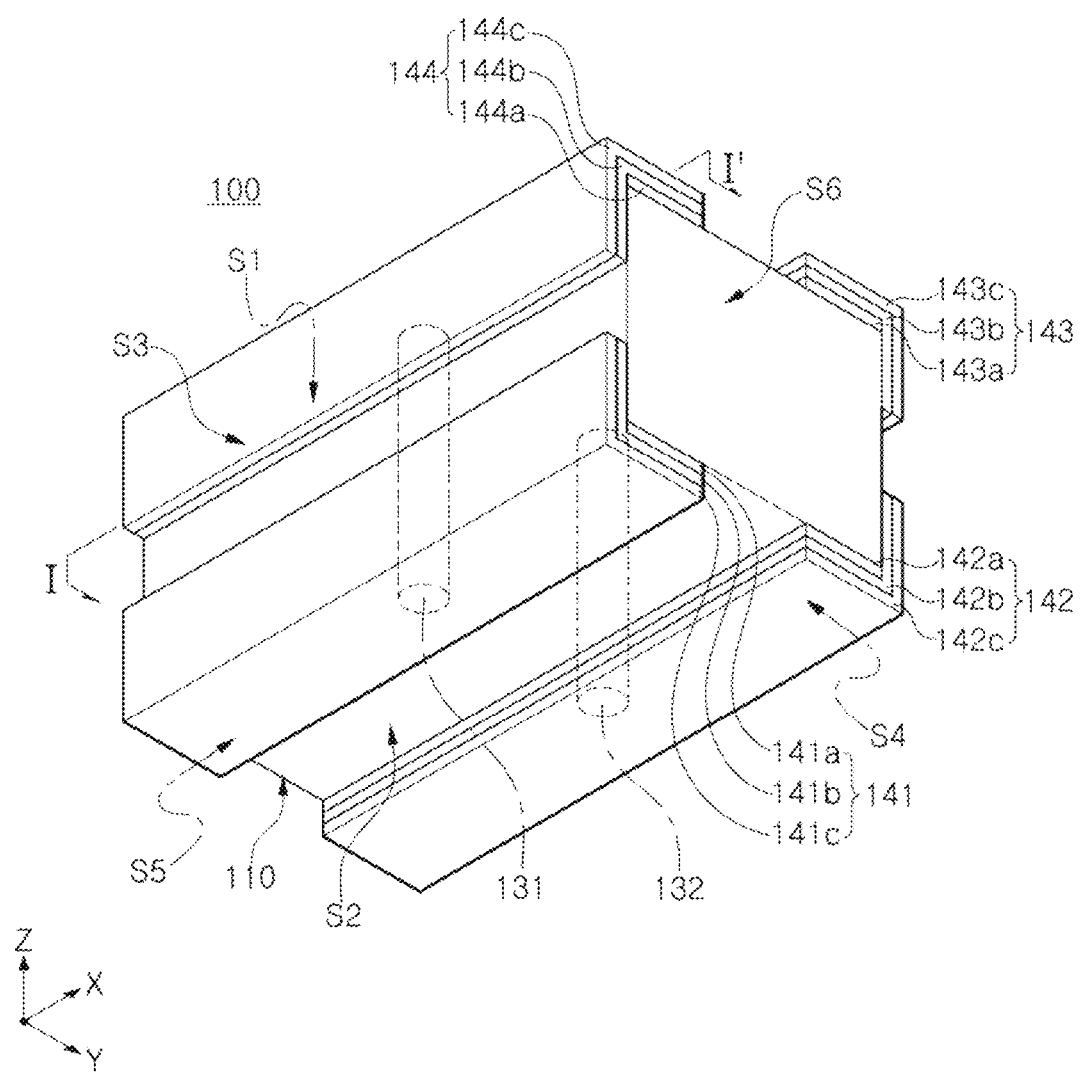
FIG. 1 is a schematic perspective view of a multilayer ceramic capacitor according to an embodiment of the present disclosure.

Hereinafter, embodiments of the present disclosure will now be described in detail with reference to the accompanying drawings. The present disclosure may, however, be exemplified in many different forms and should not be construed as being limited to the specific embodiments set forth herein. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and thicknesses are enlarged in order to clearly represent layers and regions, and similar portions having the same functions within the same scope are denoted by similar reference numerals throughout the specification. Throughout the specification, when an element is referred to as "comprising", it means that it may include other elements as well, rather than excluding other elements, unless specifically stated otherwise.

In the drawings, an X direction may be defined as a first direction, an L direction, or a length direction, a Y direction may be defined as a second direction, a W direction, or a width direction, and a Z direction defined as a third direction, a T direction, or a thickness direction.

Hereinafter, a multilayer ceramic capacitor according to an example embodiment of the present disclosure will be described in detail with reference to FIGS. 1 to 3.

A multilayer ceramic capacitor 100 according to an embodiment of the present disclosure may include a body 110 including a dielectric layer 111, and first and second internal electrodes 121 and 122 with the dielectric layer 111 interposed therebetween, and including fifth and sixth surfaces S5 and S6 opposing each other in a first direction (an X direction), third and fourth surfaces S3 and S4 opposing each other in a second direction (a Y direction), and first and second surfaces S1 and S2 opposing each other in a third direction (a Z direction); a first through-electrode 131 passing through the body 110 and connected to the first internal electrode 121; a second through-electrode 132 passing through the body 110 and connected to the second internal electrode 122; first and second external electrodes 141 and 144 formed on the first and second surfaces and connected to the first through-electrode 131; and third and fourth external electrodes 142 and 143 spaced apart from the first and second external electrodes 141 and 144 and connected to the second through-electrode 132.

In this case, the first to fourth external electrodes 141, 142, 143, and 144 may be sintered electrodes including nickel. In addition, the first to fourth external electrodes 141, 142, 143, and 144 may include first plating layers 141b, 142b, 143b, and 144b, and second plating layers 141c, 142c, 143c, and 144c, respectively, sequentially stacked on sintered electrodes 141a, 142a, 143a, and 144a, wherein the first plating layers 141b, 142b, 143b, and 144b and the second plating layers 141c, 142c, 143c, and 144c may extend to and be formed on the third and fourth surfaces of the body, respectively.

In the body 110, the dielectric layer 111 and the internal electrodes 121 and 122 may be alternately stacked.

A detailed shape of the body 110 is not limited, but the body 110 may have a hexahedral shape, as illustrated in the drawings, or a shape similar to the hexahedral shape. The body 110 may have a substantially hexahedral shape, although it is not a perfect hexahedral shape, due to shrinkage of ceramic powder particles included in the body 110 during a sintering process.

The body 110 may have the first and second surfaces S1 and S2 opposing each other in the thickness direction (the Z direction), the third and fourth surfaces S3 and S4 connected to the first and second surfaces S1 and S2, and opposing each other in the width direction (the Y direction), and the fifth and sixth surfaces S5 and S6 connected to the first and second surfaces S1 and S2, connected to the third and fourth surfaces S3 and S4, and opposing each other in the length direction (the X direction). In this case, among the first, second, third, and fourth surfaces S1, S2, S3, and S4, a selected surface may be a mounting surface.

The plurality of dielectric layers 111, constituting a body 110, may be in a sintered state, and adjacent dielectric layers 111 may be integrated with each other such that boundaries therebetween are not readily apparent without using a scanning electron microscope (SEM).

According to an example embodiment, a raw material for forming the dielectric layer 111 is not limited as long as a sufficient capacitance can be obtained therewith. For example, the raw material for forming the dielectric layer 111 may be a barium titanate-based material, a lead composite perovskite-based material, a strontium titanate-based material, or the like. The barium titanate-based material may include $BaTiO_3$-based ceramic powder particles. The ceramic powder particles may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, prepared by partially dissolving calcium (Ca), zirconium (Zr), and the like in $BaTiO_3$. As an example of the raw material for forming the dielectric layer 111, various ceramic additives, organic solvents, plasticizers, binders, dispersants, and the like, may be added to the powder particles such as barium titanate ($BaTiO_3$), or the like, according to the object of the present disclosure.

First and second cover portions 112 and 113, each having a predetermined thickness, may be arranged below a lowermost internal electrode and above an uppermost internal electrode of the body 110, respectively. In this case, the first and second cover portions 112 and 113 may have the same composition as the dielectric layer 111, and may be formed by stacking at least one dielectric layer, not including an internal electrode, above an uppermost internal electrode and below a lowermost internal electrode of the body 110.

The internal electrodes 121 and 122 may include first and second internal electrodes 121 and 122 arranged alternately to oppose each other with the dielectric layer 111 interposed therebetween.

Figure 4A:
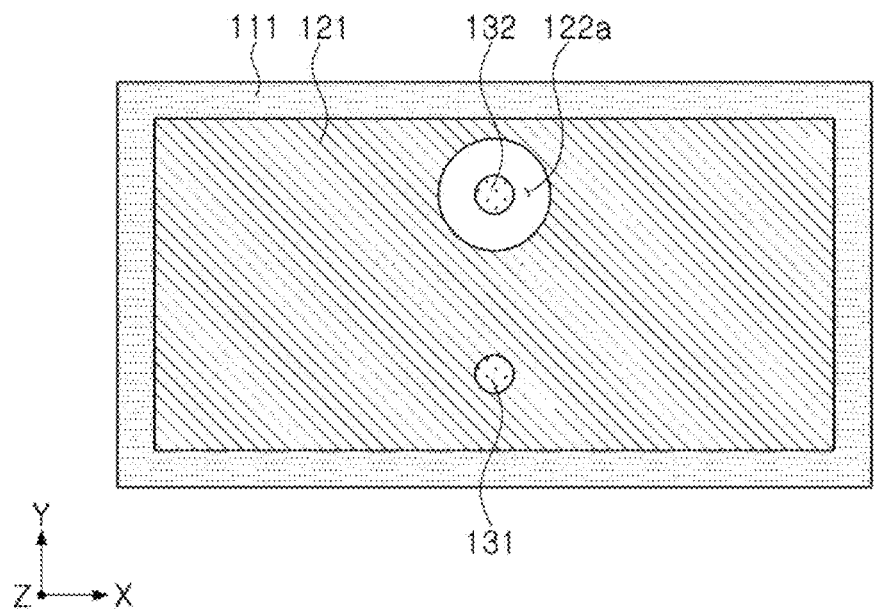
FIGS. 4A and 4B are cross-sectional views in X and Y directions of FIG. 1.

In this case, the first and second internal electrodes 121 and 122 may include first and second insulating portions 121a and 122a (see FIG. 4A), respectively. The first and second insulating portions 121a and 122a refer to regions in which the first and second internal electrodes 121 and 122 are not formed, respectively. The first and second insulating portions 121a and 122a may serve to connect the first and second internal electrodes 121 and 122 to only external electrodes having opposite polarities. For example, the first connection electrode 131 may be spaced apart from the second internal electrode 122 by the first insulating portion 121a, and the second connection electrode 132 may be spaced apart from the first internal electrode 121 by the second insulating portion 122a.

The first and second internal electrodes 121 and 122 may be respectively connected to the first and fourth external electrodes 141 and 144, and second and third external electrodes 142 and 144 by the first and second through-electrodes 131 and 132, to significantly increase an area in which the first and second internal electrodes 121 and 122 overlap each other with the dielectric layer 111 interposed therebetween. Therefore, capacitance of the multilayer ceramic capacitor 100 may be significantly increased.

The first and second internal electrodes 121 and 122 may include nickel (Ni) in a highest content, but are not limited thereto. For example, the first and second internal electrodes 121 and 122 may be formed using a conductive paste containing one or more materials among silver (Ag), palladium (Pd), gold (Au), platinum (Pt), nickel (Ni), tin (Sn), copper (Cu), tungsten (W), titanium (Ti), and alloys thereof. The conductive paste may be printed by a screen-printing method, a gravure printing method, or the like, but the present disclosure is not limited thereto.

The through-electrodes 131 and 132 may include nickel (Ni) in a highest content, but are not limited thereto. For example, the through-electrodes 131 and 132 may be formed using a conductive paste containing one or more materials among silver (Ag), palladium (Pd), gold (Au), platinum (Pt), nickel (Ni), tin (Sn), copper (Cu), tungsten (W), titanium (Ti), and alloys thereof. A method of forming the through-electrodes 131 and 132 is not limited. For example, the through-electrodes 131 and 132 may be formed by forming a stacked body in which the first and second internal electrodes 121 and 122 are stacked, passing through the body 110 in the third direction (the Z direction) using a laser drill, a mechanical pin punch, or the like, and filling the above-described conductive paste.

In an example, the internal electrodes 121 and 122 and the through-electrodes 131 and 132 may include the same metal material. The same metal material may be nickel (Ni), but is not limited thereto. For example, the same metal material may be one or more materials among silver (Ag), palladium (Pd), gold (Au), platinum (Pt), nickel (Ni), tin (Sn), copper (Cu), tungsten (W), titanium (Ti), and alloys thereof. In the case in which the internal electrodes 121 and 122 and the through-electrodes 131 and 132 of the multilayer ceramic capacitor include the same metal material, a sintering initiation temperature and/or a sintering shrinkage ratio may be matched to prevent cracking, de-lamination, or the like from occurring.

In the present specification, each of the through-holes 131 and 132 is illustrated as having a circular shape. Each of the through-holes 131 and 132 may have a hexagonal, a square, triangular shape or any convex polygonal shape and a shape thereof is not limited thereto. The through-electrodes 131 and 132 may be formed to occupy 5 to 65% in the width direction (the Y direction) of the body, but the present disclosure is not limited thereto.

In an example, the body 110 may have a thickness of 100 μm or less. The thickness of the body 110 may be a vertical distance between the first surface and the second surface, and a lower limit thereof is not limited, but may be, for example, 5 μm or more. Since the body 110 may have a thickness of 100 μm or less, a multilayer ceramic capacitor according to the present disclosure may be applied to a substrate-embedded multilayer ceramic capacitor and/or a capacitor mounted in an LSC type on a lower end portion of an AP.

According to an embodiment of the present disclosure, the first to fourth external electrodes 141, 142, 143, and 144 may be formed on both surfaces of the body 110. The first and second external electrodes 141 and 144 may respectively be disposed on the first surface S1 and the second surface S2 of the body 110, and may be connected to each other by the first through-electrode 131 described herein. The third and fourth external electrodes 142 and 143 may be spaced apart from the first and second external electrodes 141 and 144, may be respectively disposed on the first and second surfaces S1 and S2 of the body 110, and may be connected by the second through-electrode 132 described herein.

In the multilayer ceramic capacitor 100 having the above-described structure, a margin portion, connecting an upper surface and a lower surface of the body 110 to each other, may be reduced to increase a region in which the first and second internal electrodes 121 and 122 are formed. Therefore, capacitance of the multilayer ceramic capacitor 100 may be significantly increased. For example, since the multilayer ceramic capacitor 100 according to an embodiment of the present disclosure has an electrode structure in which no external electrode is disposed on a side surface, and an internal electrode is connected to an external electrode by a through-electrode passing through the body, the capacitance of the multilayer ceramic capacitor may be significantly increased.

Hereinafter, a structure of the first external electrode 141 will be described with reference to FIG. 2.

The description of the structure of the first external electrode 141 may be applied to the second to fourth external electrodes 142, 143, and 144 in the same manner.

Figure 2:
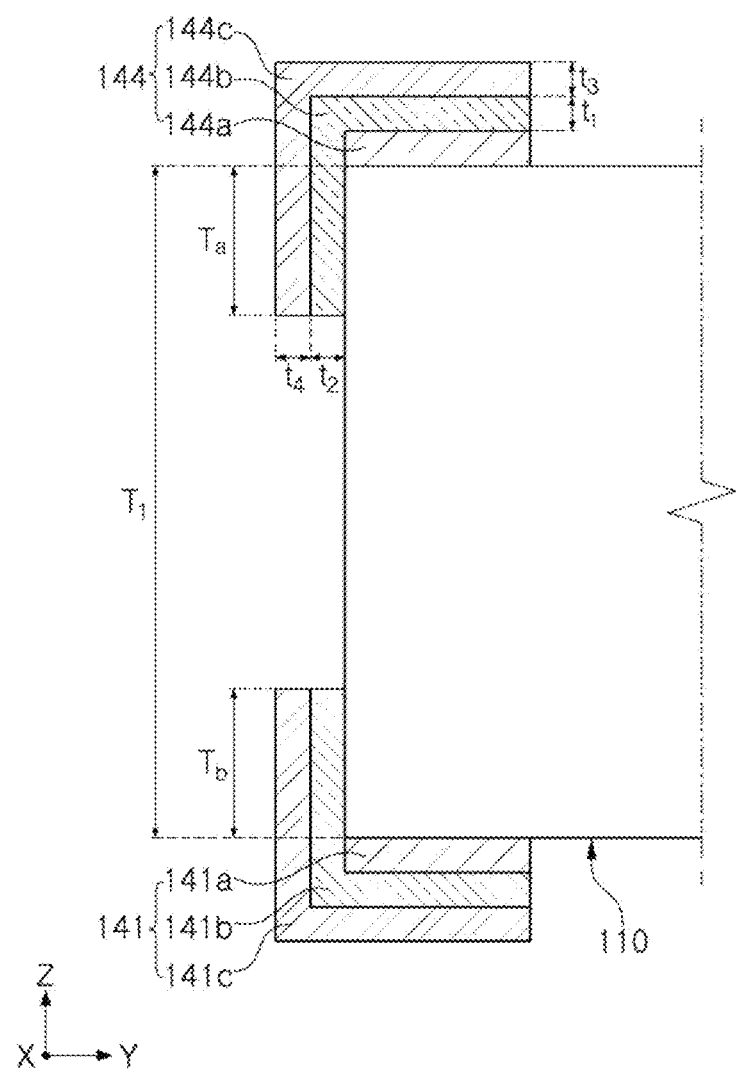
FIG. 2 is a side view of FIG. 1, when viewed in a direction S6.
Figure 3:
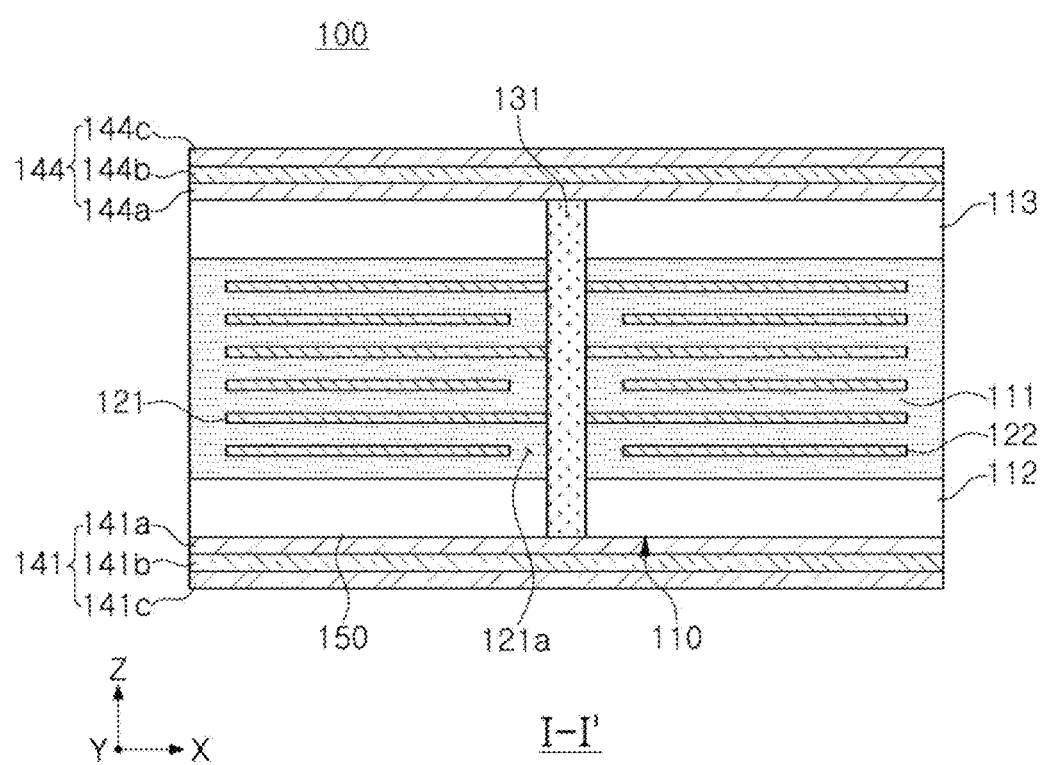
FIG. 3 is a cross-sectional view taken along line I-I' of FIG. 1.

Referring to FIG. 2, the first external electrode 141 may include a first sintered electrode 141a, and first and second plating layers 141b and 141c. The first sintered electrode 141a may include one or more materials among silver (Ag), palladium (Pd), gold (Au), platinum (Pt), nickel (Ni), tin (Sn), copper (Cu), tungsten (W), titanium (Ti), and alloys thereof. For example, the first sintered electrode 141a may be a sintered electrode formed by sintering a conductive paste including nickel (Ni). Similarly to the first sintered electrode 141, when the external electrode is formed as a sintered electrode, there is an advantage in that the external electrode may be simultaneously sintered with the body and the internal electrode, and adhesive strength between the through-electrode and the external electrode may be further improved.

According to an example of the present disclosure, a ratio ($T_2/T_1$) of a thickness ($T_1$) of the body to a length ($T_2$) of the first or second plating layer extending to the third and fourth surfaces of the body may be in the range of ⅓ to ⅖. The length ($T_2$) of the first or second plating layer extending to the third and fourth surfaces of the body may refer to the shortest distance from the end of the body to the plating layer in the Z direction, or may refer to the sum of extended lengths of the plating layers of the first external electrode 141 and the second external electrode 144 or the sum of extended lengths of the plating layers of the third external electrode 142 and the fourth external electrode 143. The sum of the extended lengths of the plating layers of the first external electrode 141 and the second external electrode 144 or the sum of the extended lengths of the plating layers of the third external electrode 142 and the fourth external electrode 143 may be an average of five randomly selected distances. Referring to FIG. 2, when the extended length of the plating layer of the first external electrode 141 is referred to as ($T_b$), and the extended length of the plating layer of the second external electrode 144 is referred to as ($T_a$), the length ($T_2$) of the first or second plating layer extending to the third and fourth surfaces of the body may refer to the sum (Ta+Tb) of (Ta) and (Tb).

Excellent adhesion strength, when mounting, may be ensured by maintaining the ratio ($T_2/T_1$) of the thickness ($T_1$) of the body to the length ($T_2$) of the first or second plating layer extending to the third and fourth surfaces of the body within the above-mentioned range. In addition, when the above-mentioned ratio is satisfied, a portion to which the boundaries between the sintered electrode and the dielectric layer are exposed may be reduced to improve the reliability for moisture resistance.

In an example, center line average roughness (Ra) of the surfaces of the sintered electrodes 141a, 142a, 143a, and 144a of the present disclosure may range from 1 nm to 100 nm. In the present specification, the "center line average roughness (Ra)" may refer to an average value of distances to a virtual center line. An external electrode, having a center line average roughness (Ra) ranging from 1 nm to 100 nm, may refer to an external electrode having surface roughness having the above-mentioned range, and may refer to an external electrode having surface roughness artificially formed to satisfy the above-mentioned range.

The center line average roughness (Ra) is a value calculated by drawing a virtual center line for roughness on the surfaces of the sintered electrodes 141a, 142a, 143a, and 144a, measuring respective distances (for example, r1, r2, r3, . . . , and rn) based on the virtual center line of the roughness, and obtaining an average value as given by Equation 1, and the center line average roughness (Ra) of the dielectric layer may be calculated.

$$Ra = \frac{\sum_{2}^{n} r_n}{n}$$ Equation 1

A sintered electrode, having center line average roughness (Ra) satisfying the above range, may be formed by surface modification using a physical or chemical method.

The surface modification method is not limited as long as the above-described roughness may be provided. For example, the surface modification method may be surface treatment using an acidic or basic solution, physical polishing using an abrasive, or the like.

Generally, an oxide layer is formed on a surface of a sintered electrode including nickel, or the like, in a sintering process. Therefore, it may be difficult to form a plating layer, and the plating layer may easily peel off. When the sintered electrode according to an embodiment of the present disclosure is surface-modified to satisfy the center line average roughness (Ra) of the above-described range, an oxide layer may be removed or a surface having a predetermined roughness may be formed. Therefore, adhesion strength between the sintered electrode and the plating layer may be enhanced, and the plating layer may be prevented from peeling off.

The first plating layer 141b according to an embodiment of the present disclosure may be a plating layer including nickel, and the second plating layer 141c may be a plating layer including copper or tin. The first plating layer 141b may include nickel to improve adhesion to the first sintered electrode 141a. Also, the second plating layer 141c may include copper or tin to form an external electrode with improved conductivity, plating adhesion, and solderability.

In an embodiment of the present disclosure, when a thickness of the first plating layer extending to the third and fourth surfaces of the body 110 is t2, and a thickness of the first plating layer disposed on the sintered electrode is t1, the multilayer ceramic capacitor may satisfy the relationship t2≥t1. FIG. 2 is a schematic diagram illustrating a structure of the sintered electrode and the plating layer of this embodiment. Referring to FIG. 2, the first plating layer 142b and the second plating layer 142c may be sequentially stacked on the second sintered electrode 142a, and the first plating layer 142b and the second plating layer 142c may be extended to and formed on the third and fourth surfaces of the body 110. In this case, the thickness (t1) of the first plating layer 142b stacked on the second sintered electrode 142a may be less than or equal to the thickness (t2) of the first plating layer 142b extending to and disposed on the third and fourth surfaces of the body 110. When the relationship between the thickness (t2) of the first plating layer 142b extending to the third and fourth surfaces of the body 110 and the thickness (t1) of the first plating layer 142b disposed on the sintered electrode 142a is satisfied, the reliability for moisture resistance may be improved together with the excellent solderability.

In another embodiment of the present disclosure, when a thickness of the second plating layer 142c extending to the third and fourth surfaces of the body 110 is t4, and a thickness of the second plating layer 142c disposed on the first plating layer 142b is t3, the multilayer ceramic capacitor may satisfy the relationship t4≥t3. FIG. 2 is a schematic diagram illustrating a structure of the first plating layer 142b and the second plating layer 142c of this embodiment. Referring to FIG. 2, the second plating layer 142c may be stacked on the first plating layer 142b, and the first plating layer 142b and the second plating layer 142c may be extended to and be formed on the third and fourth surfaces of the body 110. In this case, the thickness (t3) of the second plating layer 142c stacked on the first plating layer 142b may be less than or equal to the thickness (t4) of the second plating layer 142c extending to and disposed on the third and fourth surfaces of the body 110. When the relationship between the thickness (t4) of the second plating layer 142c extending to the third and fourth surfaces of the body 110 and the thickness (t3) of the second plating layer 142c disposed on the first plating layer 142b is satisfied, the reliability for moisture resistance may be improved together with the excellent solderability.

In an example, each of the first to fourth external electrodes 141, 142, 143, and 144 may have a thickness ranging from 1 μm to 30 μm. The thickness of each of the first to fourth external electrodes 141, 142, 143, and 144 may refer to the overall thickness to which the sintered electrode, the first plating layer, and the second plating layer are stacked, and may refer to a vertical distance from the body to the surface of the external electrode. The thickness of the external electrode may be adjusted within the above range to obtain improved mountability, without occupying a large space when used for surface mounting or substrate embedding.

Figure 5:
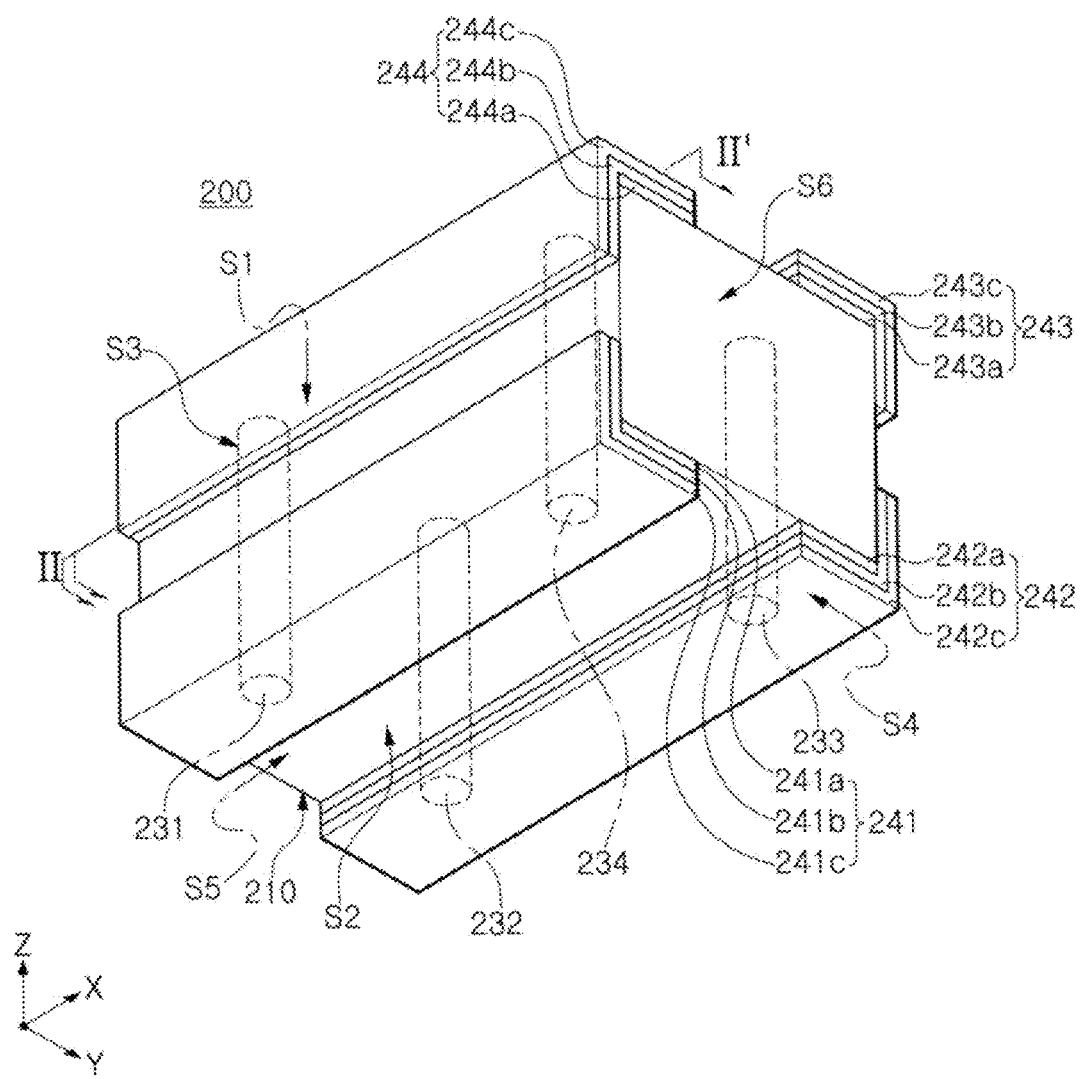
FIG. 5 is a schematic perspective view of a multilayer ceramic capacitor according to another embodiment of the present disclosure.
Figure 6:
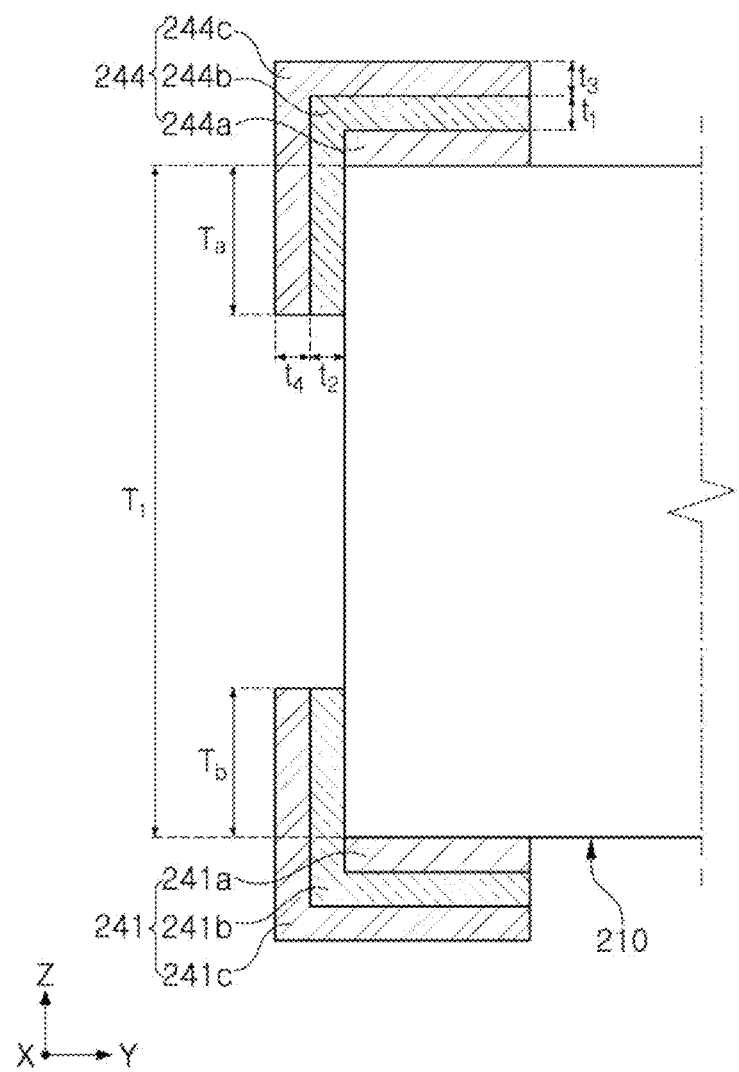
FIG. 6 is a side view of FIG. 5, when viewed in a direction S6.
Figure 7:
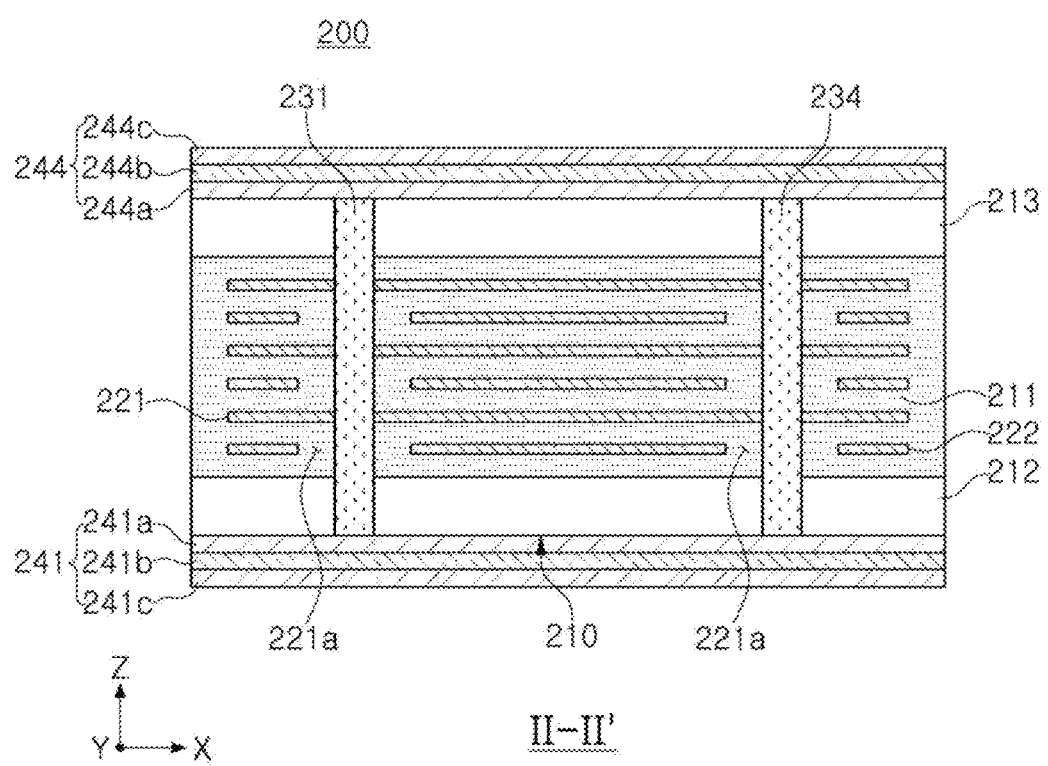
FIG. 7 is a cross-sectional vie taken along line II-II' of FIG. 5.

FIGS. 5 to 7 illustrate a multilayer ceramic capacitor according to another embodiment of the present disclosure. Hereinafter, a multilayer ceramic capacitor according to another embodiment of the present disclosure will be described in detail with reference to FIGS. 5 to 7.

A multilayer ceramic capacitor 200 according to another embodiment of the present disclosure may include a body 210 in which a first internal electrode 221, a dielectric layer 211, and a second internal electrode 222 are stacked, first to fourth connection electrodes 231, 232, 233, and 234, and first to fourth external electrodes 241, 242, 243, and 244. Materials and configurations of the dielectric layer 211, the first and second internal electrodes 221 and 222, and the first to fourth external electrodes 241, 242, 243, and 244 are the same as those described above, and therefore, descriptions thereof will be omitted.

The multilayer ceramic capacitor 200 may include a first connection electrode 231, a second connection electrode 232, a third connection electrode 233, and a fourth connection electrode 234, the first and fourth connection electrodes 231 and 234 may be connected to the first and second external electrodes 241 and 244, and the second and third connection electrodes 232 and 233 may be connected to the third and the fourth external electrodes 242 and 243. As described above, since a plurality of connection electrodes may be provided to connect the first external electrode and the second external electrode and to connect the third external electrode and the fourth external electrode, adhesion strength between the external electrode and the body may be further enhanced.

Figure 8A:
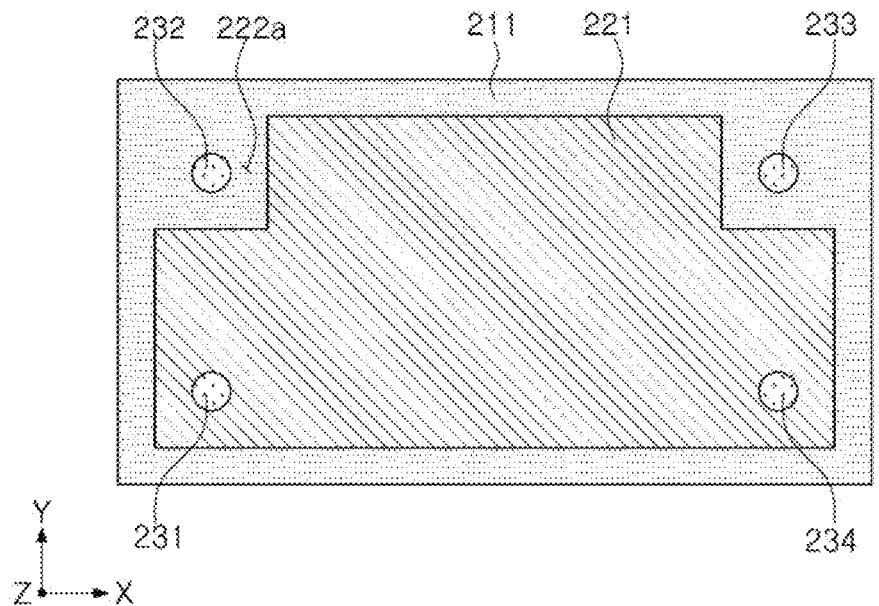
FIGS. 8A and 8B are cross-sectional views in X and Y directions of FIG. 5.
Figure 8B:
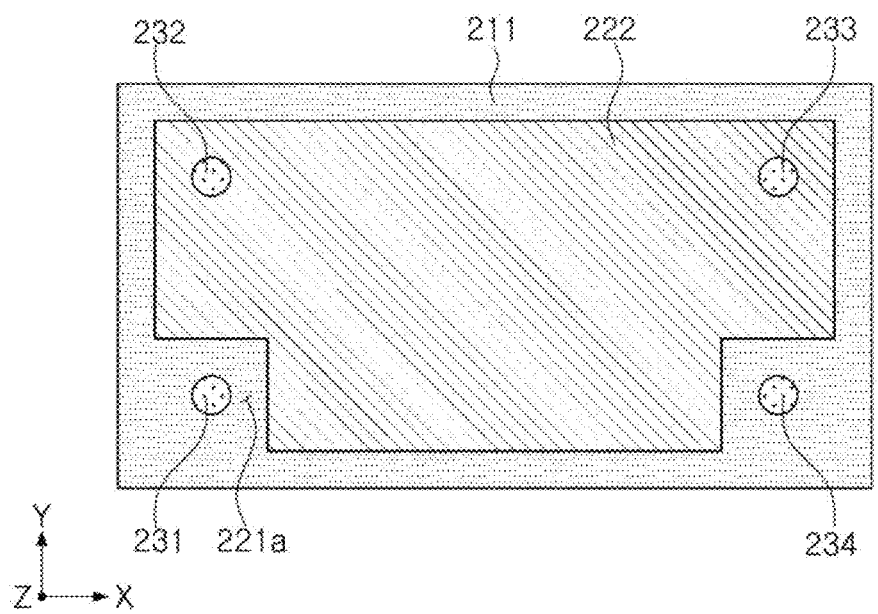

FIGS. 8A and 8B are cross-sectional views illustrating shapes of the first internal electrode 221 and the second internal electrode 222. Referring to FIGS. 8A and 8B, the first internal electrode 221 and the second internal electrode 222 may have a T shape to be point-symmetrical to each other. The first internal electrode 221 may have a T-shaped electrode pattern. A non-disposition region 222a, in which no electrode pattern is formed, may be an insulating region. The second internal electrode 222 may have a T-shaped electrode pattern. A non-disposition region 221a, in which no electrode pattern is formed, may be an insulating region.

In the multilayer ceramic capacitor having the electrode pattern, the first and fourth connection electrodes 231 and 234 may be connected to the first internal electrode 221, and may pass through the non-disposition region 221a of the second internal electrode 222. The second and third connection electrodes 232 and 233 may be connected to the second internal electrode 222, and may pass through the non-disposition region 222a of the first internal electrode 221. With the structure in which the connection electrode passes through the non-disposition region of the internal electrode, a multilayer ceramic capacitor according to the present disclosure may offset mutual inductance to improve equivalent series inductance (ESL), and may increase in capacitance, as compared with a structure in which a via hole is formed in an internal electrode.

Figure 9A:
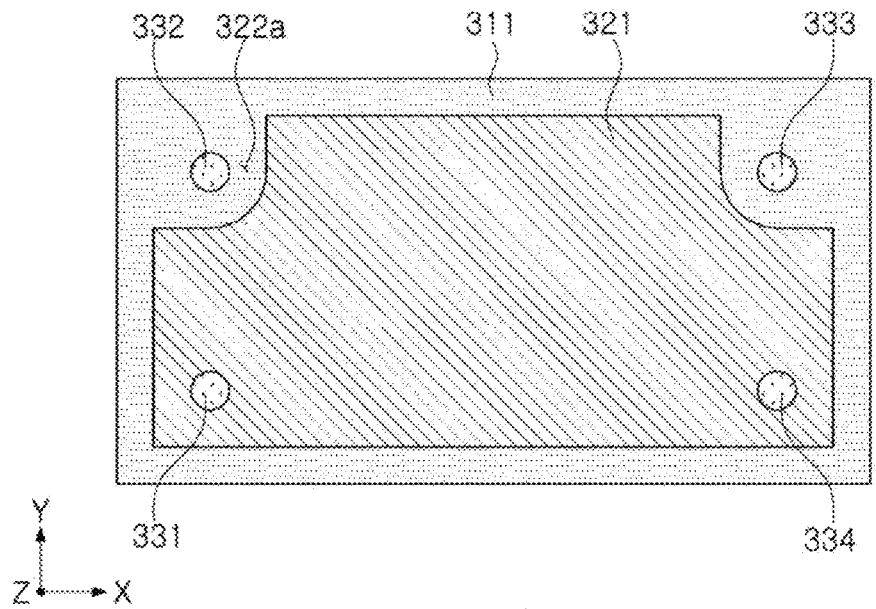
FIGS. 9A and 9B are cross-sectional views in X and Y directions of FIG. 5, and illustrate a multilayer ceramic capacitor according to another embodiment of the present disclosure.
Figure 9B:
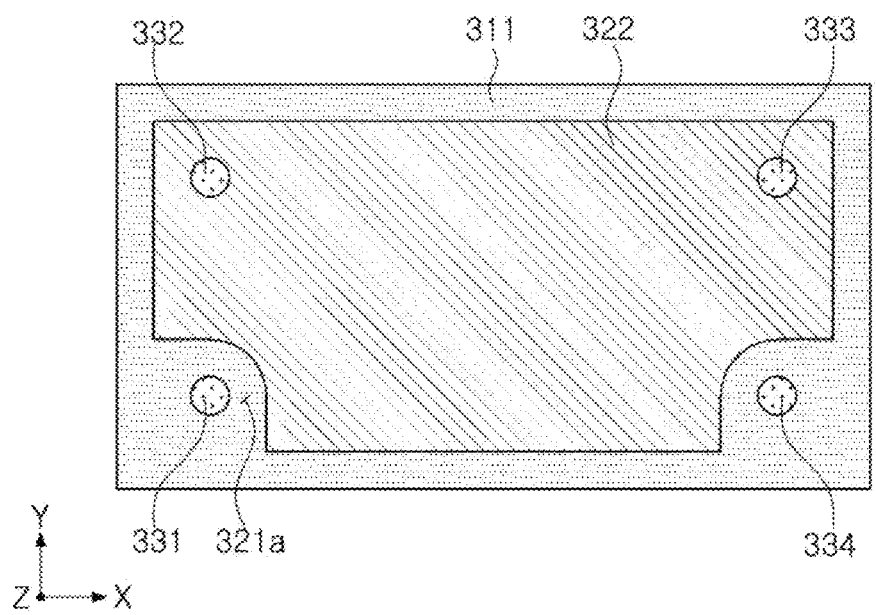

In an example, the non-disposition regions 321a and 322a of the first and second internal electrodes 321 and 322 may be rounded. Referring to FIGS. 9A and 9B, the first internal electrode 321 may have a T-shaped electrode pattern, and the non-disposition region 322a, in which no internal electrode is disposed, may be formed to have a rounded shape. The second internal electrode 322 may have a T-shaped electrode pattern, and the non-disposition region 321a, in which no internal electrode is disposed, may be formed to have a rounded shape. As described above, when a recessed portion of the internal electrode pattern is formed to be rounded, capacity of the multilayer ceramic capacitor may be further increased.

In the above, a case, in which the non-disposition regions of the internal electrodes have a square shape and a rounded shape, has been described as an example, but a shape of the internal electrode pattern is not limited thereto. For example, the internal electrode may have various shapes such as a triangular shape, a polygonal shape, and the like, which all belong to the scope of the present disclosure.

Figure 10A:
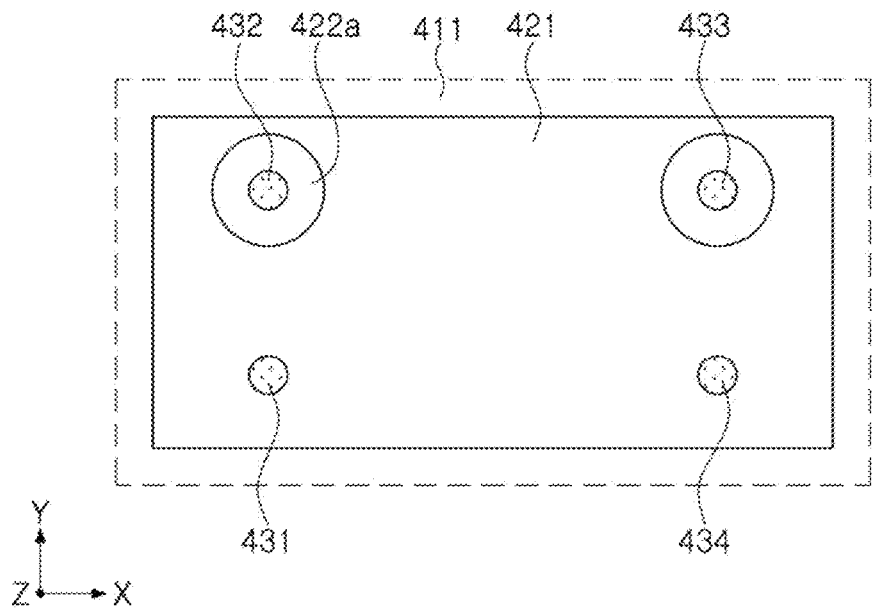
FIGS. 10A and 10B are cross-sectional views in X and Y directions of FIG. 5, and illustrate a multilayer ceramic capacitor according to another embodiment of the present disclosure.
Figure 10B:
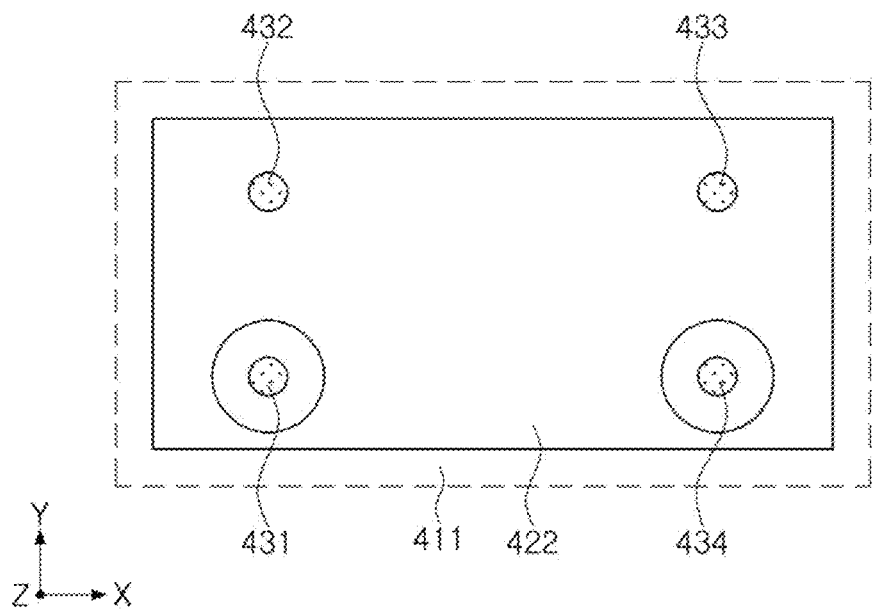
Figure 11:
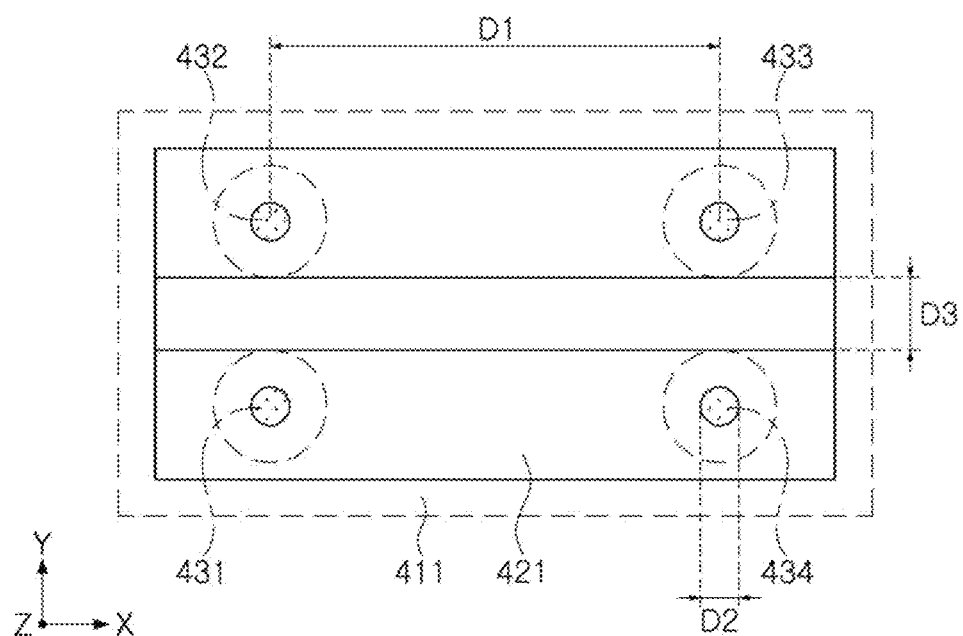
FIG. 11 is a side view of FIG. 5, when viewed in an S1 direction.

FIGS. 10A, 10B, and 11 are cross-sectional views illustrating another embodiment in the present disclosure. Referring to FIGS. 10A, 10B, and 11, first and second internal electrodes 421 and 422 may be point-symmetrical to each other, and each of the first and second internal electrodes 421 and 422 may have a rectangular shape. The first internal electrode 421 may have second and third via holes, and the second internal electrode 422 may have first and fourth via holes. In this case, the first and fourth connection electrodes 431 and 434 may be connected to the first internal electrode 421, and may pass through the first and fourth via holes of the second internal electrode 422. The second and third connection electrodes 432 and 433 may be connected to the second internal electrode 422, and may pass through the second and third via holes of the first internal electrode 421. The first and fourth connection electrodes 431 and 434 may be disposed to pass through the first and fourth via holes of the second internal electrode 422, such that the first and fourth connection electrodes 431 and 434 may be electrically insulated from the second internal electrode 422. The second and third connection electrodes 432 and 433 may be disposed to pass through the second and third via holes of the first internal electrode 421, such that the second and third connection electrodes 432 and 433 may be electrically insulated from the first internal electrode 422.

FIG. 11 illustrates a distance (D1) between the first and fourth connection electrodes 431 and 434 or a distance (D1) between the second and third connection electrodes 432 and 433, a diameter (D2) (or maximum width in case of a non-circular shaped connection electrode) of each of the first to fourth connection electrodes 431, 432, 433, and 434, and a distance (D3) between the first via hole and the second via hole, or an a distance (D3) between the third via hole and the fourth via hole.

Referring to FIG. 11, a ratio (D1/D3) of the distance (D1) between the first and fourth connection electrodes 431 and 434 or the distance (D1) between the second and third connection electrodes 431 and 434 to the distance (D3) between the first via hole and the second via hole in this embodiment may range from 2.08 to 4.7. The ratio (D1/D3) may be 2.08 or more, 2.20 or more, 2.30 or more, 2.40 or more, 2.50 or more, 2.60 or more, 2.70 or more, 2.80 or more, 2.90 or more, 3.00 or more, 3.05 or more, 3.10 or more, or 3.15 or more, and may 4.700 or less, 4.695 or less, 4.690 or less, or 4.688 or less, but is not limited thereto. When the ratio (D1/D3) of the distance (D1) between the first and fourth connection electrodes, or the distance (D1) between the second and third connection electrodes to the distance (D3) between the first via hole and the second via hole satisfies the above range, equivalent series inductance (ESL) may be reduced. In detail, when the ratio is 3.125 or more, the ESL reduction effect may be significantly improved.

In another embodiment of the present disclosure, a ratio (D2/D3) of the diameter (D2) of the first connection electrode or the second connection electrode to the distance (D3) between the first via hole and the second via hole may range from 0.375 to 0.52. The ratio (D2/D3) of the diameter (D2) of the first connection electrode or the second connection electrode to the distance (D3) between the first via hole and the second via hole may be 0.375 or more, 0.380 or more, 0.385 or more, 0.390 or more, 0.395 or more, 0.400 or more, 0.405 or more, or 0.410 or more, and may be 0.52 or less. When the ratio (D2/D3) of the diameter (D2) of the first connection electrode or the second connection electrode to the distance (D3) between the first via hole and the second via hole satisfies the above range, equivalent series inductance (ESL) may be reduced. In detail, when the ratio (D2/D3) is 0.41 or more, the ESL reduction effect may be significantly improved. When the ratio (D2/D3) is 0.52 or more, the capacitance of the capacitor may be reduced.

Hereinafter, a method of manufacturing a multilayer ceramic capacitor according to the present disclosure will be described. From the description of the method, the structure of the multilayer ceramic capacitor described above may be illustrated more clearly.

First, a body including a dielectric layer and first and second internal electrodes with the dielectric layer interposed therebetween may be prepared by stacking a sheet, on which a paste including a conductive metal is printed, on one surface of a ceramic green sheet including a dielectric layer of a predetermined thickness. A first cover portion and a second cover portion may be formed by stacking dielectric layers, each not including an internal electrode, on upper and lower portions of the body.

After the cover portions are formed, a via H may be formed in the body using a laser drill, a mechanical pin punch, or the like. Then, first and second through-electrodes may be formed by applying a conductive paste to the via H or filling a conductive material using plating or the like.

Then, first to fourth external electrodes may be formed on one surface of the body to be connected to the first and second through-electrodes.

Specifically, formation of the first to fourth external electrodes may be carried out by operations including: forming first to fourth sintered electrodes, each including nickel, on the body; forming first plating layers on each of the first to fourth sintered electrode layers; forming second plating layers on each of the first plating layers; and forming third plating layers on each of the second plating layers.

The sintered electrode may be formed by applying a conductive paste, including nickel, and sintering the conductive paste. The first plating layer may include tin, and may be formed by an electrical or chemical plating method. The second plating layer may include nickel, and may be formed by an electrical or chemical plating method. The third plating layer may include copper or tin, and may be formed by an electric or chemical plating method.

Figure 4B:
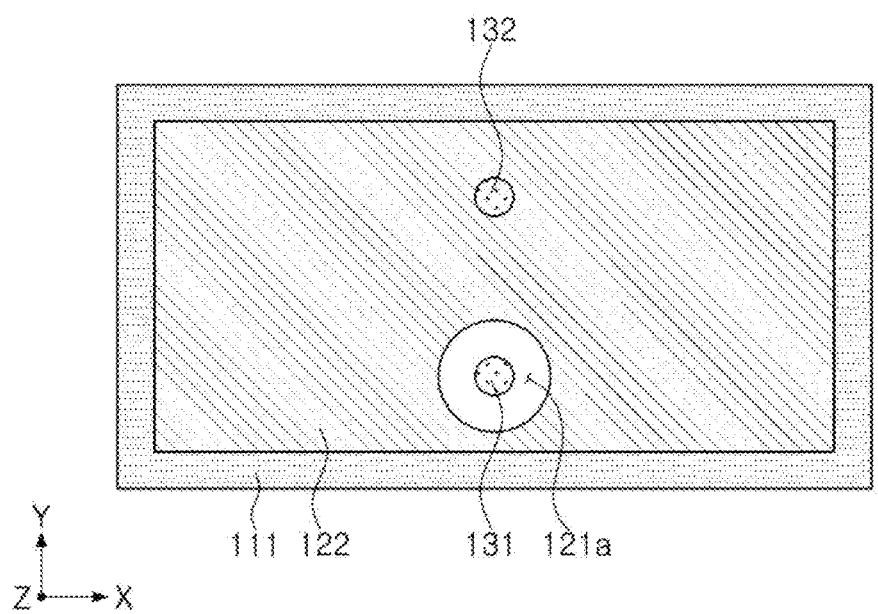

After the sintered electrode is formed, sintering and plasticization are performed to form the first plating layer to the third plating layer. As a result, the multilayer ceramic capacitor, illustrated in FIGS. 1 and 4, is completed.

Although the embodiments of the present disclosure have been described in detail above, the present disclosure is not limited to the above-described embodiments and the accompanying drawings, and is intended to be limited by the appended claims. Accordingly, various forms of substitution, modification, and alteration may be made by those skilled in the art without departing from the technical spirit of the present disclosure described in the claims, which may be also within the scope of the present disclosure.

According to an embodiment of the present disclosure, adhesive strength of a multilayer ceramic capacitor may be improved by applying a sintered electrode, including nickel, to an external electrode connected to a through-electrode passing through a body.

According to another embodiment of the present disclosure, a plating layer may be disposed on a side surface of the body to increase a bonding area with a solder during mounting, and the reliability for moisture resistance may be improved.

According to another embodiment of the present disclosure, a surface of an external electrode may have center line average roughness (Ra) to form a nickel-plated layer on the external electrode.

According to still another embodiment of the present disclosure, a multilayer ceramic capacitor, having improved adhesion to a substrate while having a low profile, may be provided.

According to still another embodiment of the present disclosure, occurrence of cracking, caused by mismatching or the like in a sintering process, may be prevented to improve reliability of products.

However, various and advantageous advantages and effects of the present disclosure are not limited to the above description, and will be more readily understood in the course of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic capacitor comprising:
   a body including a dielectric layer, and first and second internal electrodes with the dielectric layer interposed therebetween, and including fifth and sixth surfaces opposing each other in a first direction, third and fourth surfaces opposing each other in a second direction, and first and second surfaces opposing each other in a third direction;
   first external electrode disposed on the first surface of the body;
   second external electrode disposed on the second surface of the body;
   third external electrode disposed on the first surface of the body and spaced apart from the first external electrode;
   fourth external electrode disposed on the second surface of the body and spaced apart from the second external electrode;
   a first through-electrode passing through the body and connected to the first internal electrode and between the first and second external electrodes; and
   a second through-electrode passing through the body and connected to the second internal electrode and between the third and fourth external electrodes,
   wherein each of the first and second external electrodes comprises a first sintered portion disposed respectively on only the first and second surfaces and a first plating portion, the first plating portion extending to the third surface of the body forming a first gap therebetween, and
   wherein each of the third and fourth external electrodes comprises a second sintered portion disposed respectively on only the first and second surfaces and a second plating portion, the second plating portion extending to the fourth surface of the body and forming a second gap therebetween.

2. The multilayer ceramic capacitor according to claim 1, wherein the first and second plating portions are disposed on the third and fourth surfaces of the body and to be more biased toward the third surface or the fourth surface than the first and second sintered portions.

3. The multilayer ceramic capacitor according to claim 2, wherein the first and second plating portions are in contact respectively with the third surface and the fourth surface of the body, and
   the first and second sintered portions are in contact respectively with the first surface and the second surface of the body.

4. The multilayer ceramic capacitor according to claim 1, wherein the first and second plating portions extending to the third and fourth surfaces are thinner than portions of the first through fourth second external electrodes disposed on the first and second surfaces.

5. The multilayer ceramic capacitor according to claim 1, wherein points of the third and fourth surfaces overlapping the first and second through-electrodes in the second direction are not covered by the first to fourth external electrodes.

6. The multilayer ceramic capacitor according to claim 1, wherein each of the first to fourth external electrodes is L-shaped in view of the first direction.

7. The multilayer ceramic capacitor according to claim 1, wherein a ratio (T2/T1) is in a range from 1/3 to 2/5, wherein T1 is a thickness of the body and T2 is a length of each of the first and second gaps.

8. The multilayer ceramic capacitor according to claim 1, wherein a center line average roughness (Ra) of the sintered electrode is in a range from 1 nm to 100 nm.

9. The multilayer ceramic capacitor according to claim 1, wherein the first and second sintered portions comprise nickel.

10. The multilayer ceramic capacitor according to claim 9, wherein the first and second plating portions comprise a first plating layer comprising nickel and a second plating layer comprising copper or tin, and
the first plating layer is disposed between the second plating layer and corresponding sintered portion.

11. The multilayer ceramic capacitor according to claim 10, wherein, when a thickness of the first plating layer extending to the third and fourth surfaces of the body is t2, and a thickness of the first plating layer disposed on the sintered electrode is t1, the multilayer ceramic capacitor satisfies the relationship t2≥t1.

12. The multilayer ceramic capacitor according to claim 10, wherein, when a thickness of the second plating layer extending to the third and fourth surfaces of the body is t4, and a thickness of the second plating layer disposed on the sintered electrode is t3, the multilayer ceramic capacitor satisfies the relationship t4≥t3.

13. The multilayer ceramic capacitor according to claim 9, wherein the first and second internal electrodes comprise nickel.

14. The multilayer ceramic capacitor according to claim 9, wherein the first and second through-electrode comprise nickel.

15. The multilayer ceramic capacitor according to claim 1, wherein the first through-electrode comprises first and fourth connection electrodes connecting to first and second external electrodes, and
the second through-electrode comprises second and third connection electrodes connecting to third and fourth external electrodes.

16. The multilayer ceramic capacitor according to claim 15, wherein the first and second internal electrodes are T-shaped to be point-symmetrical to each other,
the first and fourth connection electrodes pass through a region in which the second internal electrode is not disposed, and
the second and third connection electrodes pass through a region in which the first internal electrode is not disposed.

17. The multilayer ceramic capacitor according to claim 15, wherein the first and second internal electrodes are rectangular to be point-symmetrical to each other,
the first internal electrode comprises second and third via holes,
the second internal electrode comprises first and fourth via holes,
the first and fourth connection electrodes pass through the first and fourth via holes of the second internal electrode, and
the second and third connection electrodes pass through the second and third via holes of the first internal electrode.

18. The multilayer ceramic capacitor according to claim 17, wherein a ratio (D1/D3) of a distance (D1) of the first and fourth connection electrodes or a distance (D1) of the second and third connection electrodes to a distance (D3) between the first via hole and the second via hole is in a range from 2.08 to 4.7.

19. The multilayer ceramic capacitor according to claim 17, wherein a ratio (D2/D3) of a diameter (D2) of the first connection electrode or the second connection electrode to a distance (D3) between the first via hole and the second via hole is in a range from 0.375 to 0.52.

* * * * *